United States Patent [19]

Inoue et al.

[11] Patent Number: 5,794,506
[45] Date of Patent: Aug. 18, 1998

[54] REACTION MECHANISM FOR BRAKE BOOSTER

[75] Inventors: Hidefumi Inoue; Naohito Saito, both of Saitama-ken, Japan

[73] Assignee: Jidosha Kiki Co., Ltd., Tokyo, Japan

[21] Appl. No.: 895,356

[22] Filed: Jul. 16, 1997

[51] Int. Cl.$^6$ .................................................... F15B 9/10
[52] U.S. Cl. .................................................... 91/369.2
[58] Field of Search ..................... 91/369.2, 369.3, 91/376 R

[56] References Cited

U.S. PATENT DOCUMENTS

| Re. 26,487 | 11/1968 | French | 91/369.2 |
|---|---|---|---|
| 3,548,595 | 12/1970 | Pech et al. | 91/369.3 |
| 4,611,526 | 9/1986 | Arino et al. | |
| 4,664,016 | 5/1987 | Tobisawa et al. | |
| 4,813,338 | 3/1989 | Mortimer et al. | 91/376 R |
| 5,121,674 | 6/1992 | Uyama | |
| 5,146,837 | 9/1992 | Inoue | |
| 5,425,302 | 6/1995 | Levrai et al. | 91/369.2 |
| 5,642,652 | 7/1997 | Inoue et al. | |
| 5,699,713 | 12/1997 | Mortimer | 91/369.2 |

FOREIGN PATENT DOCUMENTS

| 299628 | 4/1992 | Germany | 91/369.2 |
|---|---|---|---|
| 8-85442 | 4/1996 | Japan | |

Primary Examiner—F. Daniel Lopez
Attorney, Agent, or Firm—Flynn, Thiel, Boutell & Tanis, P.C.

[57] ABSTRACT

A valve plunger, which forms part of a reaction mechanism of a brake booster, comprises a plunger member and a valve side member which are disposed to be slidable relative to each other, with a first spring disposed therebetween. A piston is slidably disposed within a valve body, and a given clearance is formed between the rear end face of the plunger member and the piston. A second spring having a greater resilience than the first spring is disposed between the piston and the valve body, and is compressed after the first spring is initially compressed. With this construction, as a brake reaction increases, the first spring is compressed to cause the plunger member to abut against the piston, and subsequently the first and second spring are compressed. A point where the compression of the first spring is initiated can determine a point where a servo ratio is changed, and the magnitudes of the resilience of the both springs permit an arbitrary choice of a servo ratio which prevails subsequent to the point where the servo ratio is changed.

6 Claims, 5 Drawing Sheets

REACTION MECHANISM FOR BRAKE BOOSTER

FIELD OF THE INVENTION

The invention relates to a brake booster, and more particularly, to a reaction mechanism for brake booster which transmits a reaction to a brake pedal which is used to operate a brake booster.

DESCRIPTION OF THE PRIOR ART

A brake booster is known in the art which comprises a valve body slidably disposed within a shell, a power piston mounted on the valve body, a constant and a variable pressure chamber defined across the power piston, a valve mechanism disposed in the valve body, an input shaft for driving a valve plunger, which forms part of the valve mechanism, back and forth to thereby switch a flow path in the valve mechanism, an output shaft driven forward as the valve body is driven forward, and a reaction disc interposed between one end of the output shaft and the valve plunger.

In a brake booster of the kind described, a brake reaction applied to the output shaft is transmitted to a brake pedal through the reaction disc, the valve plunger and the input shaft. When the proportion of the reaction which is transmitted to the brake pedal is reduced, it is possible to operate the brake booster with a reduced force of depression while the maneuverability is degraded in a range in which a braking force of a reduced magnitude is required. Accordingly, there has been proposed a reaction mechanism for brake booster in which the valve plunger mentioned above is formed of a forwardly located plunger member and a rearwardly located valve side member which are disposed to be slidable relative to each other, with a coiled spring disposed therebetween (see Japanese Laid-Open Patent Application No. 85,442/96). In this reaction mechanism, for a range in which a braking force of a reduced magnitude is required, the plunger member and valve side member are integrally connected together through the coiled spring, and hence a servo ratio in this range can be chosen small to provide a better brake feeling. On the other hand, as a brake reaction increases, the reaction can be used to compress the coiled spring. This is equivalent to a further depression for the valve side member of the valve plunger by an amount corresponding to the compression of the coiled spring. Accordingly, after the compression of the coiled spring has begun, the servo ratio can be increased, allowing a braking force of an increased magnitude to be obtained with a reduced force of depression.

In order to determine a point where the compression of the coiled spring is initiated (or a point where the servo ratio changes) or to determine the magnitude of a subsequent servo ratio, it is necessary to choose a particular preset load to which the coiled spring is charged or a particular spring constant. However, in a conventional reaction mechanism for brake booster, it has been difficult to choose a coiled spring of a required magnitude. Specifically, it is difficult, for practical purposes, to choose a coiled spring having a spring constant of such a magnitude which allows the compression of the coiled spring to be continued after the compression of the coiled spring is initiated at a given magnitude of an output from the brake booster, until the brake booster reaches a full load condition. In the reaction mechanism disclosed in the cited Application, the compression of the coiled spring is completed before the brake booster reaches the full load condition. When the compression of the coiled spring is completed, and the valve plunger

2 and the reaction disc again operate in an integral manner, the servo ratio returns to an original small value, and hence, an increase in a brake output relative to an increase in the force of depression becomes reduced subsequently, thus degrading the brake feeling.

SUMMARY OF THE INVENTION

In view of the foregoing, the invention provides a reaction mechanism for brake booster which provides a greater freedom than heretofore available in choosing a spring having a required spring constant.

Specifically, in a brake booster including a valve body slidably disposed within a shell, a power piston mounted on the valve body, a constant and a variable pressure chamber defined across the power piston, a valve mechanism disposed in the valve body, an input shaft for driving a valve plunger, which forms part of the valve mechanism, back and forth to switch a flow path in the valve mechanism, and a reaction disc interposed between one end of the output shaft and the valve plunger; according to a first aspect of the invention, the valve plunger comprises a forwardly located plunger member and a rearwardly located valve side member which are disposed to be slidable relative to each other, with a first spring disposed between the plunger member and the valve side member, and a piston is slidably disposed within the valve body with a given clearance with respect to a rear end face of the plunger member, with a second spring having a greater resilience than the first spring disposed between the piston and the valve body so that the first spring is compressed first before the second spring is compressed.

According to a second aspect of the invention, in the same arrangement of the brake booster, the valve plunger comprises a forwardly located plunger member and a rearwardly located valve side member which are disposed to be slidable relative to each other, with a first spring disposed between the plunger member and the valve side member, and a second spring having a greater resilience than the first spring being disposed between the plunger member and the valve side member with a given spacing with respect to the first spring so that the first spring is compressed first before the second spring is compressed.

In the arrangement according to either aspect of the invention, the first spring is disposed between the plunger member and the valve side member, and the plunger member and the valve side member operate in an integral manner until the first spring becomes compressed by a brake reaction, thus reducing a servo ratio in such range in the same manner as in the prior art, and providing a good brake feeling.

According to the first aspect of the invention, when the brake reaction increases to compress the first spring, the rear end face of the plunger member abuts against the piston, which therefore retracts, causing the plunger member to be also subject to the resilience of the second spring disposed between the piston and the valve body, in addition to the resilience of the first spring.

On the other hand, according to the second aspect of the invention, when the brake reaction increases to compress the first spring, the second spring is held sandwiched between the plunger member and the valve side member, whereby the plunger member is subjected to the resilience of the second spring disposed between the piston and the valve body, in addition to the resilience of the first spring.

As a consequence, it follows that the valve side member in the valve plunger is subjected to a further depression by an amount corresponding to the compression of the both springs, thereby permitting the servo ratio to be increased. In this manner, a braking force of an increased magnitude can be obtained with a reduced force of depression. It is to be noted that the degree of compression of the both springs (or the magnitude of the servo ratio) is principally determined by the second spring which has a greater resilience than the first spring. This means that a greater freedom is afforded in the design as compared with the prior art arrangement in which the point where the compression is initiated and the magnitude of the spring constant must be chosen by way of a single spring. In this manner, the operational response of the brake booster can be more freely chosen than in the prior art, enabling an excellent brake feeling to be obtained for the entire range.

Above and other objects, features and advantages of the invention will become apparent from the following description with reference to the attached drawings.

DETAILED DESCRIPTION OF THE EMBODIMENTS

Figure 1:
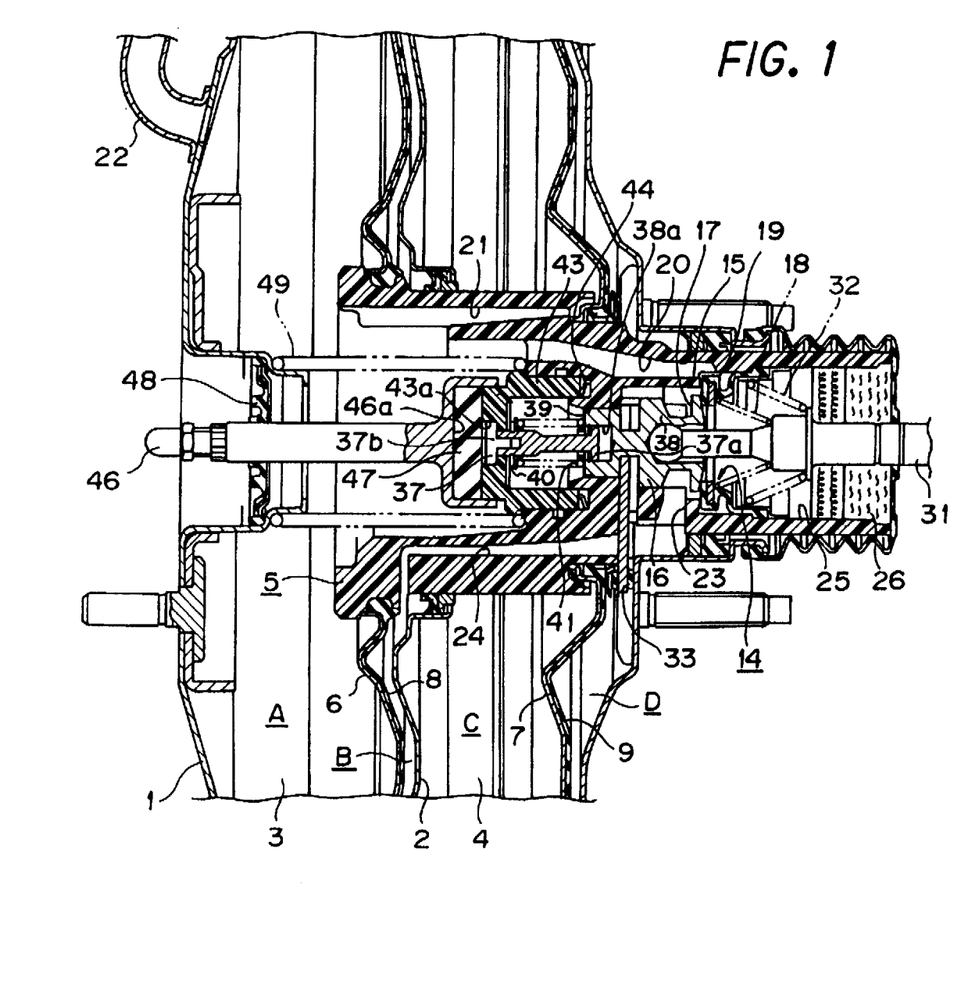
FIG. 1 is a cross section of a first embodiment of the invention.

Referring to the drawings, the invention will be described below with reference to several embodiments shown in the drawings. Referring to FIG. 1, a brake booster of tandem type includes a shell 1, the interior of which is partitioned by a center plate 2 into a front chamber 3 and a rear chamber 4. A tubular valve body 5 slidably extends through the rear wall of the shell 1 and the center plate 2 where a hermetic seal is maintained by seal means.

A front power piston 6 and a rear power piston 7 are connected around the outer periphery of the valve body 5 at locations which are disposed within the front chamber 3 and the rear chamber 4, respectively, and a front diaphragm 8 and a rear diaphragm 9 are applied to the back surfaces of the power pistons 6, 7, respectively. A constant pressure chamber A and a variable pressure chamber B are defined across the front diaphragm 8, while a constant pressure chamber C and a variable pressure chamber D are defined across the rear diaphragm 9.

The valve body 5 contains a valve mechanism 14 which switches a communication between the constant pressure chambers A, C and the variable pressure chambers B, D. Specifically, the valve mechanism 14 comprises an annular first valve seat 15 formed on the valve body 5, an annular second valve seat 17 disposed radially inward of the first valve seat 15 and is formed on the rear portion of a valve plunger 16 which is slidably disposed in the valve body 5, and a valve element 19 which is urged to be seated upon either valve seat 15 or 17 under the influence of a poppet return spring 18.

A space located radially outward of an annular seat defined by the valve element 19 which moves into engagement with or disengagement from the first valve seat 15 communicates with the constant pressure chamber A through a first constant pressure passage 20 formed in the valve body 5. The constant pressure chamber A communicates with the constant pressure chamber C through a second constant pressure passage 21. The constant pressure chamber A communicates with a source of negative pressure, not shown, through a conduit 22, whereby the negative pressure is normally introduced into the both constant pressure chambers A and C.

A space located radially inward of an annular seat defined by the first valve seat 15 and valve element 19 and radially outward of an another seat defined by the valve element 19 which moves into engagement with or disengagement from the second valve seat 17 communicates with the variable pressure chamber D through a radially extending first variable pressure passage 23 formed in the valve body 5, and the variable pressure chamber D communicates with the variable pressure chamber B through a second variable pressure passage 24 formed in the valve body 5.

Finally, a space located radially inward of the seat defined by the combination of the second valve seat 17 and the valve element 19 communicates with the atmosphere through a pressure passage 25 formed by the inner peripheral surface of the valve body 5 and a filter 26 disposed therein.

The right end of the valve plunger 16 is pivotally connected with a distal end of an input shaft 31, and a valve return spring 32 having a greater resilience than the poppet return spring 18 is disposed between the input shaft 31 and the valve body 5, thus normally maintaining the valve element 19 seated upon the second valve seat 17 on the valve plunger 16 while maintaining the valve element 19 away from the first valve seat 15 on the valve body 5. The other end of the input shaft 31 is coupled to a brake pedal, not shown.

A key member 33 prevents a disengagement of the valve plunger 16 from the valve body 5. The key member 33 is retractable in the axial direction of the valve body 5, and when the brake booster is inoperative, it abuts against the internal surface of the shell 1 to maintain the valve plunger 16 at an advanced position relative to the valve body 5, thus reducing a lost motion of the input shaft 31 at the commencement of operation of the brake booster.

Figure 2:
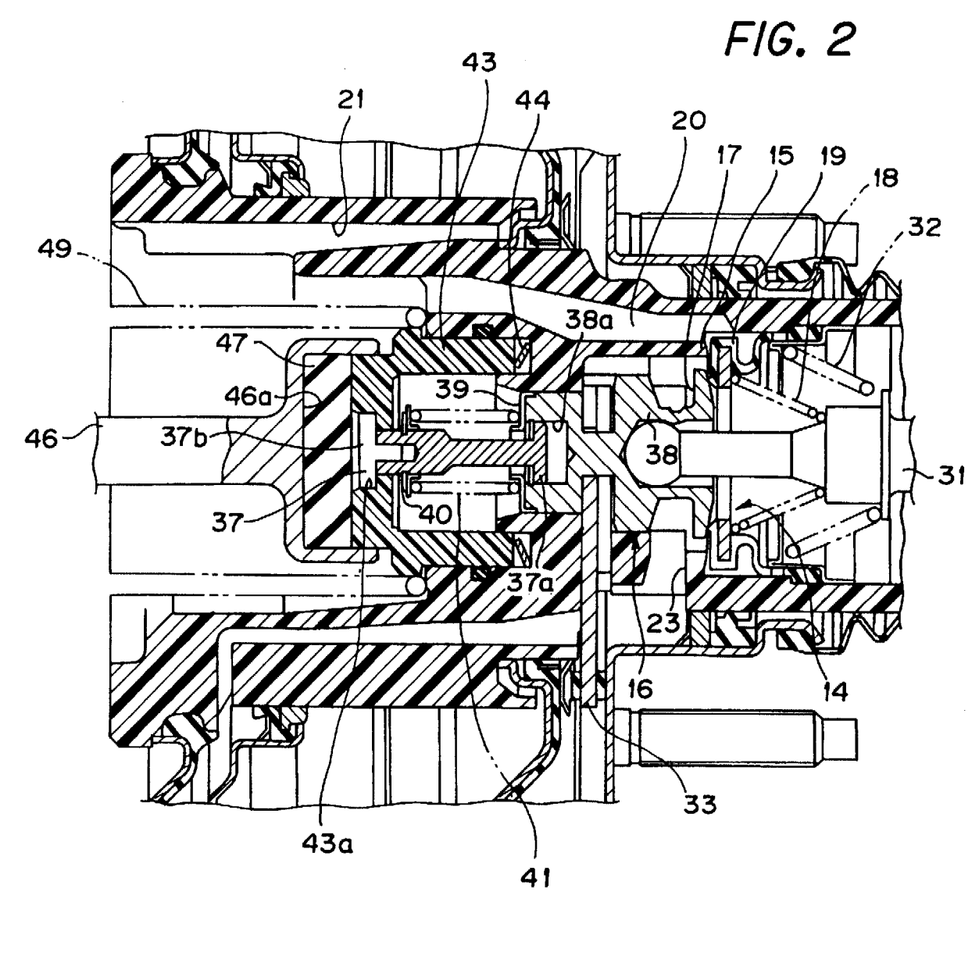
FIG. 2 is an enlarged view of a pertinent portion shown in FIG. 1.

The valve plunger 16 comprises a forwardly located plunger member 37 and a rearwardly located valve side member 38, with the rear end of the plunger member 37 being slidably fitted into a recess 38a formed in the front end of the valve side member 38. A stop member 39 is disposed in the opening of the recess 38a, and a first spring 41 is disposed between the stop member 39 and a retainer 40 disposed around a forward portion of the plunger member 37 to urge the plunger member 37 and valve side member 38 apart, thus normally maintaining a stop 37a provided at the rear end of the plunger member 37 in abutment against the stop member 39.

The plunger member 37 is slidably fitted into a stepped through-opening 43a formed in the front end wall of a cup-shaped piston 43 which is slidably disposed within the valve body 5. The stepped through-opening 43a has a greater diameter at its front end, and the plunger member 37 includes a portion 37b of an increased diameter which is slidably fitted into the opening of a portion having a greater diameter at its front end.

A second spring 44, formed by a Belleville spring, is disposed between the rear end of the piston 43 and the valve body 5, and has a greater resilience than the first spring 41. An arrangement is made such that when the second spring 44 is gently held between the piston 43 and the valve body 5 and when the stop 37a of the plunger member 37 is in abutment against the stop member 39, a given clearance is formed between the portion 37b of an increased diameter and the piston 43.

A recess 46a is formed in the right end of an output shaft 46, and a reaction disc 47 is fitted into the recess 46a. A forward portion of the piston 43 is slidably fitted into the recess 46a to hold the rear end face of the reaction disc 47 in abutment against the front end face of the piston 43, whereby the front end face of the portion 37b of an increased diameter of the plunger member 37 opposes the reaction disc 47 with a given clearance therebetween.

The left or distal end of the output shaft 46 projects externally of the shell 1 while maintaining a hermetic seal by means of a seal member 48, with the end being connected to a piston of a master cylinder, not shown, which is mounted on the shell 1.

It is to be noted that the valve body 5 and the power pistons 6, 7 are normally maintained in the inoperative positions shown by a return spring 49.

With the described arrangement, when a brake pedal is depressed to drive the input shaft 31 and the valve plunger 16 forward, the plunger member 37 and the valve side member 38, which form together the valve plunger 6, is driven forward integrally while maintaining their inoperative conditions.

As the valve side member 38 of the valve plunger 16 is driven forward, a flow path in the valve mechanism 14 is switched to introduce the atmosphere into the variable pressure chambers B and D, whereby a pressure differential between the constant pressure chambers A and C and the variable pressure chambers B and D drives the both power pistons 7, 8 and the valve body 5 forward to drive the output shaft 46 forward in turn, thus generating a braking liquid pressure in a master cylinder, in the similar manner as occurs in a conventional brake booster.

A brake reaction which results from the braking liquid pressure is transmitted to the reaction disc 47 through the output shaft 46, and subsequent to the reaction disc 47, the reaction is divided into one portion transmitted to the piston 43 and another portion transmitted to the plunger member 37. The portion of the reaction which is transmitted to the piston 43 is received by the valve body 5 through the second spring 44. On the other hand, the portion of the reaction transmitted to the plunger member 37 is transmitted to a brake pedal through the retainer 40 on the plunger member 37, the first spring 41, the valve side member 38 and the input shaft 31. A relationship between the output of the brake booster and a force of depression (input) applied to a brake pedal is graphically shown by a straight line A shown in FIG. 3.

Figure 3:
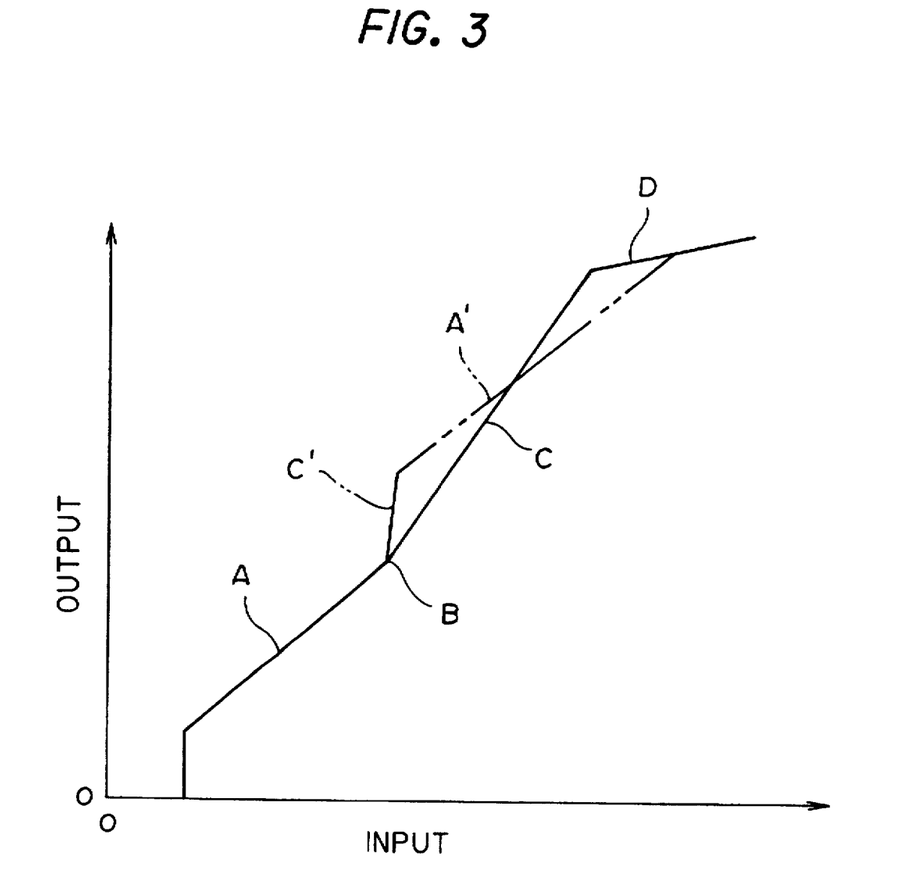
FIG. 3 graphically shows the operational response of the embodiment.

As the force of depression applied to the brake pedal increases to increase the output from the brake booster, the brake reaction also increases, and when the reaction exceeds the preset load to which the first spring 41 is charged, the first spring 41 begins to be compressed (point B shown in FIG. 3). Since the preset load to which the second spring 44 is charged is chosen to be greater than the preset load to which the first spring 41 is charged, the piston 43 cannot retract. The point B can be freely established by changing the preset load to which the first spring 41 is charged.

When the first spring 41 is compressed, the portion 37b of an increased diameter of the plunger member 37 abuts against the piston 43, and subsequently, the plunger member 37 and the piston 43 will be displaced integrally relative to the valve body 5 under the influence of the brake reaction.

It will be seen that when the first spring 41 is compressed, the valve side member 38 will be advanced relative to the valve body 4 by a corresponding amount, and accordingly, the output from the brake booster increases with a greater servo ratio (as shown by a straight line C in FIG. 3) than the servo ratio indicated by the straight line A. It is to be understood that the inclination of the straight line C (or the servo ratio) can be freely established, in particular, by suitably choosing a spring constant for the second spring 44.

Assuming that the piston 43 were not provided, after the preset load to which the first spring 41 is charged is exceeded, a subsequent spring constant will determine the inclination of the straight line C. However, it is generally difficult to choose a first spring 41 having an increased spring constant, and therefore, the inclination will be very sharp, as indicated by phantom lines C' in FIG. 3. In addition, the degree to which the first spring 41 is compressed cannot be chosen so large in consideration of the deformation of the reaction disc 47. Accordingly, once the compression of the first spring 41 reaches a given amount, it is necessary to connect the plunger member 37 and the valve side member 38 together in an integral manner. As a consequence of this, the subsequent servo ratio will resume an original value, which is indicated by a straight line A' in FIG. 3.

However, in the present embodiment, the amount of compression which the first spring 41 experiences coincides with the amount of compression which the second spring 44 experiences, which in turn coincides with the stroke by which the piston 43 retracts. Accordingly, the inclination of the straight line C can be freely established by suitably choosing a spring constant for the second spring 44, in particular, as mentioned previously.

The spring constants of the pair of the springs 41, 44 are chosen so that the brake booster assumes a full load condition (straight line D) in the course of the springs 41, 44 being compressed. In other words, the brake booster reaches its full load condition before the plunger member 37 abuts against the valve side member 38 to become integral therewith.

Second Embodiment

Figure 4:
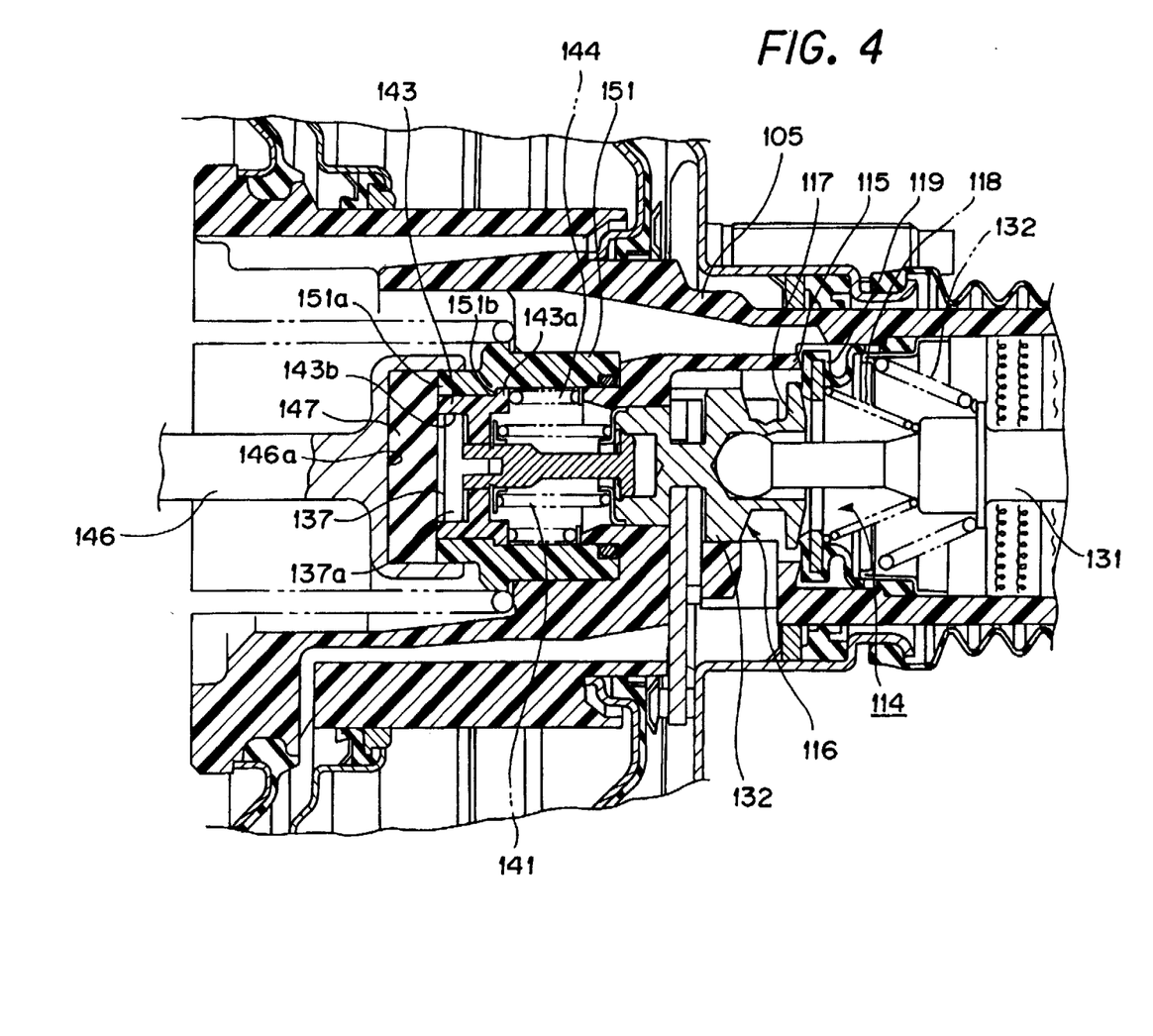
FIG. 4 is a cross section of a second embodiment of the invention.

FIG. 4 shows a second embodiment of the invention in which a tubular member 151 is integrally mounted on a valve body 105, and includes a forward portion which is provided as an annular projection 151a projecting forwardly from the valve body. Ring-shaped piston 143 is slidably fitted into the tubular member 151, and a second spring 144 comprising a coiled spring is disposed between the piston 143 and the valve body 105. A stop 143a formed at the rear end of the piston 143 around its outer periphery is disposed in abutment against a stepped stop 151b which is formed on the inner surface of the tubular member 151, thus normally maintaining the piston 143 in its inoperative position shown. The piston 143 is formed with a stepped through-opening 143b including a portion of an increased diameter in which a portion 137a of an increased diameter at the front end of the plunger member 137 is slidably fitted, in the similar manner as in the previous embodiment. The annular projection 151a is slidably fitted into a recess 146a formed in one end of an output shaft 146, thus disposing the respective front end faces of the annular projection 151a, the piston 143 and the plunger member 137 in opposing relationship with a reaction disc 147 which is received in the recess 146a.

In other respects, the arrangement is similar to that shown in the first embodiment, and similar parts to those shown in connection with the first embodiment are designated by like reference numerals and characters as used before, to which "100" is added.

In the second embodiment, the basic operation remain the same as in the first embodiment, but a brake reaction which is transmitted to the reaction disc 147 through the output shaft 146 is divided from the reaction disc 147 to the tubular member 151 associated with the valve body 105, the piston 143 and the plunger member 137. As a consequence, the brake reaction which is applied to the piston 143 can be reduced, permitting a coiled spring to be used for the second spring 144.

Third Embodiment

Figure 5:
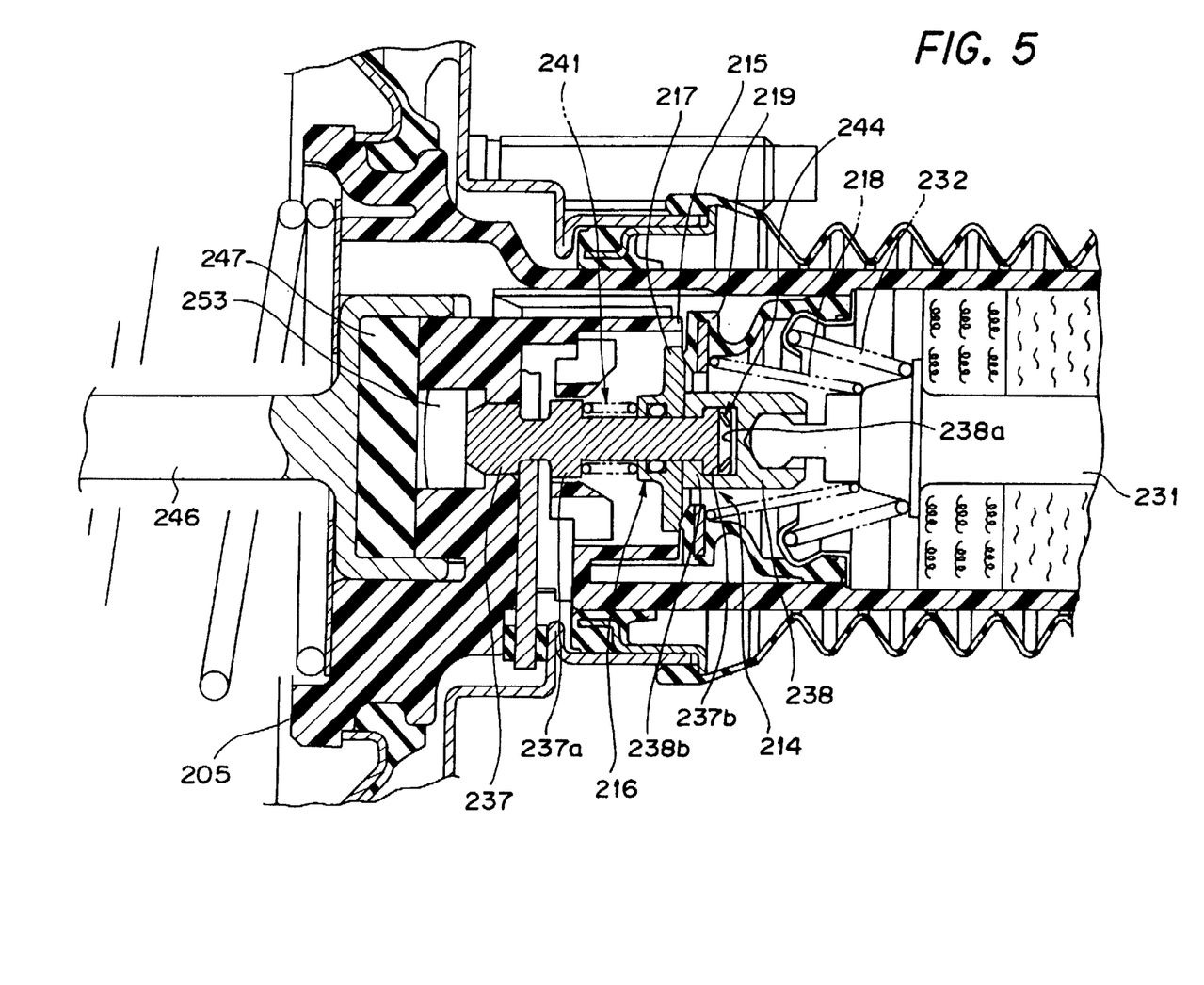
FIG. 5 is a cross section of a third embodiment of the invention.

FIG. 5 shows a third embodiment of the invention in which the provision of a piston is omitted even though the previous embodiments used pistons 43 or 143.

Specifically, in this embodiment, a plunger member 237, which constitutes a valve plunger 216, has a rear end which is slidably fitted into a bottomed recess 238a formed in a front portion of a valve side member 238. A first spring 141 is disposed between an annular projection 237a formed around the outer periphery of the plunger member 237 and the valve side member 238, thus normally maintaining a stop 237b formed around the outer periphery at the rear end of the plunger member 237 in abutment against a stepped stop 238b formed on the valve side member 238 at the location forwardly of the recess 238a.

A second spring 244, formed by a Belleville spring, is disposed between the rear end face of the plunger member 237 and the bottom of the recess than an has an axial size chosen to be less than an axial size between the rear end face of the plunger member 237 and the bottom of the recess 238a when the stop 237b of the plunger member 237 is in abutment against the stepped stop 238b on the valve side member 238, thus providing a clearance therebetween. A forward portion of the plunger member 238 is slidably fitted into a valve body 205, and is disposed in opposing relationship with a reaction disc 247 with a plate plunger 253, which is slidably disposed on the valve body 205, interposed therebetween.

In other respects, the arrangement is similar to the first embodiment, and accordingly, corresponding parts to those shown in connection with the first embodiment are designated by like reference numerals and characters as used before, to which "200" is added.

In the third embodiment, a brake reaction is transmitted to the plunger member 237 through an output shaft 246 and the reaction disc 247, and when the reaction exceeds the preset load to which the first spring 241 is charged, the latter is compressed. Since there is a clearance between the rear end face of the plunger member 237 and the bottom of the recess 238a, there is no influence upon a point (indicated at B in FIG. 3) where the compression of the first spring 241 is initiated. As the first spring 241 is compressed, the second spring 244 is held between the rear end face of the plunger member 237 and the bottom of the recess 238a, and accordingly, the plunger member 237 and the valve side member 238 are compressed against the combined resilience of the springs 241 and 244. As a consequence, an output from the brake booster will increase with a servo ratio (as indicated by a straight line C in FIG. 3) which is greater than the servo ratio (indicated by the inclination of the straight line A in FIG. 3) which prevailed before. The inclination of the straight line C can be freely established by suitably choosing a spring constant for the second spring 244, in particular.

While the invention has been described above in connection with several embodiments thereof, it should be understood that a number of changes, modifications and substitutions therein are possible by one skilled in the art from the above disclosure without departing from the scope and the spirit of the invention defined by the appended claims.

What is claimed is:

1. In a brake booster including a valve body slidably disposed within a shell, a power piston mounted on the valve body, a constant and a variable pressure chamber defined across the power piston, a valve mechanism disposed in the valve body, an input shaft for driving a valve plunger, which forms part of the valve mechanism, back and forth to switch a flow path in the valve mechanism, an output shaft which is driven forward as the valve body is driven forward, and a reaction disc interposed between one end of the output shaft and the valve plunger; a reaction mechanism for brake booster characterized in that the valve plunger comprises a forwardly located plunger member and a rearwardly located valve side member which are disposed to be slidable relative to each other, with a first spring being disposed between the plunger member and the valve side member, a piston being slidably disposed within the valve body with a given clearance with respect to the rear end face of the plunger member, a second spring having a greater resilience than the first spring being disposed between the piston and the valve body so that the first spring is compressed initially before the second spring is compressed.

2. A reaction mechanism according to claim 1 in which the plunger member slidably extends through the piston and includes a portion of an increased diameter at its front end, the rear end face of the portion of an increased member being disposed in opposing relationship with an end face of the piston with a given clearance.

3. A reaction mechanism according to claim 1 in which said reaction disc is received in a recess formed in one end of the output shaft, and the piston is slidably fitted into the recess, the respective front end faces of the piston and the plunger member being disposed in opposing relationship with the reaction disc.

4. A reaction mechanism according to claim 1 in which the piston and the plunger member are disposed inside an annular projection formed on the valve body, the reaction disc being received in a recess which is formed in one end of the output shaft, the annular projection being slidably fitted into the recess so that the respective front end faces of the annular projection, the piston and the plunger member are disposed in opposing relationship with the reaction disc.

5. In a brake booster including a valve body slidably disposed within a shell, a power piston mounted on the valve body, a constant and a variable pressure chamber defined across the power piston, a valve mechanism disposed in the valve body, an input shaft for driving a valve plunger, which forms part of the valve mechanism, back and forth to switch a flow path in the valve mechanism, an output shaft which is driven forward as the valve body is driven forward, and a reaction disc interposed between one end of the output shaft and the valve plunger; a reaction mechanism for brake booster characterized in that the valve plunger comprises a forwardly located plunger member and a rearwardly located valve side member which are disposed to be slidable relative to each other, with a first spring being disposed between the plunger member and the valve side member, and a second spring having a greater resilience than the first spring being disposed between the plunger member and the valve side member with a given spacing with respect to the first spring so that the first spring is compressed initially before the second spring is compressed.

6. A reaction mechanism according to claim 5 in which the rear end of the plunger member is slidably fitted into a bottomed recess formed in the forward portion of the valve side member, the first spring being disposed between an annular projection formed around the outer periphery of the plunger member and the valve side member, and the second spring being disposed between the rear end face of the plunger member and the bottom of the recess.

* * * * *

UNITED STATES PATENT AND TRADEMARK OFFICE
CERTIFICATE OF CORRECTION

PATENT NO. : 5 794 506
DATED : August 18, 1998
INVENTOR(S) : Hidefumi INOUE, et al.

It is certified that error appears in the above-identified patent and that said Letters Patent is hereby corrected as shown below:

On the title page, please add ---[30] Foreign Application Priority Data, August 9, 1996 [JP] Japan 227897/96---.

Signed and Sealed this

Twenty-seventh Day of April, 1999

*Attest:*

Q. TODD DICKINSON

*Attesting Officer*   Acting Commissioner of Patents and Trademarks